Figure 1:
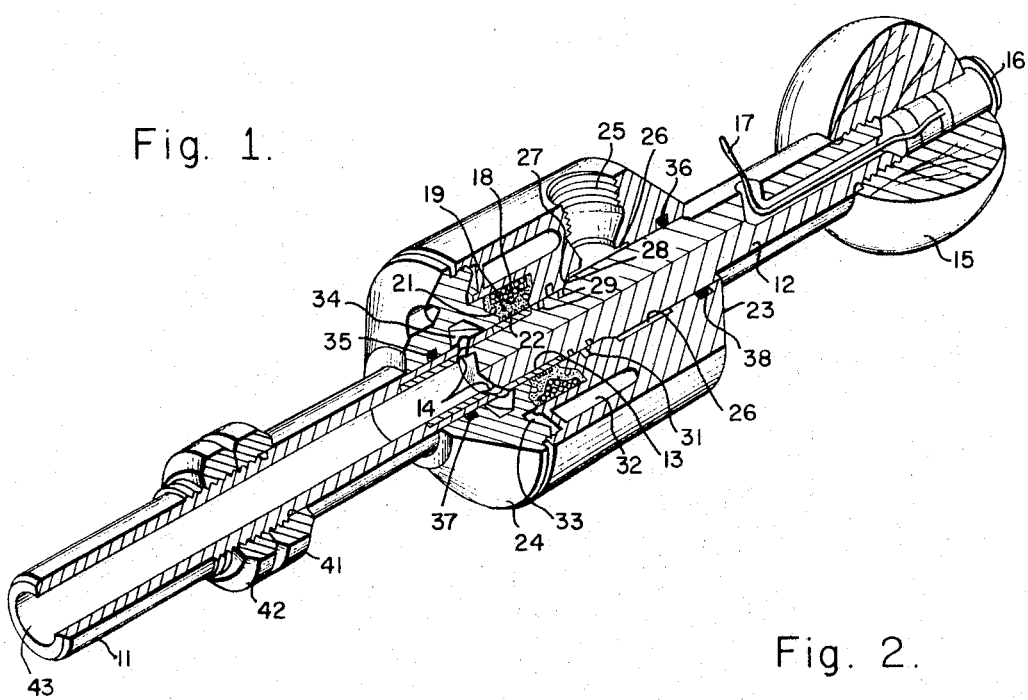

Jan. 24, 1967   J. R. SMIRRA   3,299,905
SOLDER VALVE
Filed April 3, 1964

Johannes R. Smirra,
INVENTOR.

BY.

E. Hayward Marshall

AGENT.

United States Patent Office 3,299,905
Patented Jan. 24, 1967

3,299,905
SOLDER VALVE
Johannes R. Smirra, Los Angeles, Calif., assignor to
TRW Inc., Redondo Beach, Calif., a corporation of
Ohio
Filed Apr. 3, 1964, Ser. No. 357,112
10 Claims. (Cl. 137—341)

This invention relates to a solder valve and more particularly to a fluid tight valve which will not leak gas or liquid, even over extended periods of time, but may be quickly and easily released, when desired.

Many previous valves of various constructions have been made which utilize a pool of liquid solder in conjunction with face contact surfaces having annular end flanges and grooves which interact with the solder when solidified to provide a fluid tight seal. However, when sealing a valve of this type under pressure, the fluid will blow out the solder around the valve seat, unless a very complex arrangement is provided for equalizing the pressure on both sides of the valve seat during the hardening of the solder. Furthermore, this type of valve can only be used in certain positions, since the molten solder will leak out when the valve is inclined or turned upside down with respect to its normal vertical position. Other types of valves utilize a solid ring of fusable material which is inserted to lock the valve in a closed position, and may be released by the heat from a fire or other source for opening the valve under these conditions. However, these are usually one shot or single operation devices which have to be rebuilt for a second use and cannot be recycled continuously or periodically between the open and closed position.

Briefly stated, one preferred embodiment of the present invention consists essentially of a central axial shaft which is hollow at one end and has a plurality of openings extending through the side wall thereof into an annular recess communicating with the inlet opening in the open position of the valve. A heating element surrounds a porous sealing ring which is filled with solder and mounted in a housing surrounding the shaft which has a sleeve, preferably formed of copper or some other metal having an affinity for solder, for contact with the porous ring in the closed position of the valve.

The porous ring may also be provided with a plurality of small recesses which form a reservoir for solder to assure an adequate supply of solder for forming a tight seal between the porous ring and the copper sleeve. The porous ring may also be provided with a plurality of internal annular grooves which hold the solder in contact with the sleeve and also provides a scraping and cleaning action during movement of the valve in order to assure clean surfaces on the porous ring and the sleeve for the next soldering action.

The valve housing is provided with a frusto-conical seat between the inlet opening and the porous ring which engages a frusto-conical portion on the shaft for throttling the flow of fluid in conjunction with a plurality of annular grooves on the valve housing and the shaft to provide a labyrinth throttling effect during closure of the valve. This will minimize the amount of pressure which would be applied to the solder seal during the period that the solder is hardening. These annular grooves also provide a heat barrier together with other annular passages in the valve body which may be filled with insulation to minimize heat conduction through the valve housing and concentrate the heat in the porous ring to melt the solder during movement of the valve between the open and closed position.

The porous sealing ring may be formed of sintered metal, a porous ceramic material, or pressed metallic wool, such as steel wool, and the pores as well as the recesses and grooves in the porous ring may be filled with any suitable solder. For certain applications, such as at very low temperatures, it may be desirable to use some metal, such as mercury or certain alloys and amalgams, which have a very low melting point and which will form an amalgam with the contiguous surfaces of the sealing ring and the sleeve. If desired the heating element may be positioned inside of the sleeve or two heating elements, one inside the sleeve and the other in the housing, may be used in the combination. If required for particularly difficult sealing problems, a plurality of spaced solder sealing rings may be utilized at various points along the shaft in combination with corresponding sleeves to prevent leakage of the fluid in any direction.

The valve may be sealed in either the open or closed position by applying electrical current to the heating element, moving the shaft with respect to the valve housing and then allowing the solder to solidify. However, the valve could also be sealed for example in the closed position and released by some external heating, such as a fire or over-heating of electronic equipment, with some auxiliary means for moving the shaft when the solder is molten.

One object of the present invention is to provide a fluid tight valve wherein the sealing solder is held in position by a porous element which holds the solder by capillarity and forms a reservoir for the solder.

Another object of the present invention is to provide a solder valve wherein the fluid is throttled by a frusto-conical seat and a labyrinth formed by a series of grooves positioned between the inlet opening and the solder seal.

A further object of the present invention is to provide a fluid tight solder valve which has a self-cleaning, scraping action provided by grooves in the porous element holding the solder, as well as grooves on the shaft and other parts of the contacting valve surfaces.

Still another object of the present invention is to provide a fluid tight solder valve which may be opened readily, either by heating to soften the solder, or if it is desired to open the valve extremely fast without waiting for the solder to melt, the valve may be opened by an impact force, which will shear the soft solder permitting the valve to move very rapidly into the open position.

A still further object of the present invention is to provide a fluid tight solder valve which is operative in any position with respect to gravity or other acceleration forces which may be acting on the valve.

Figure 2:
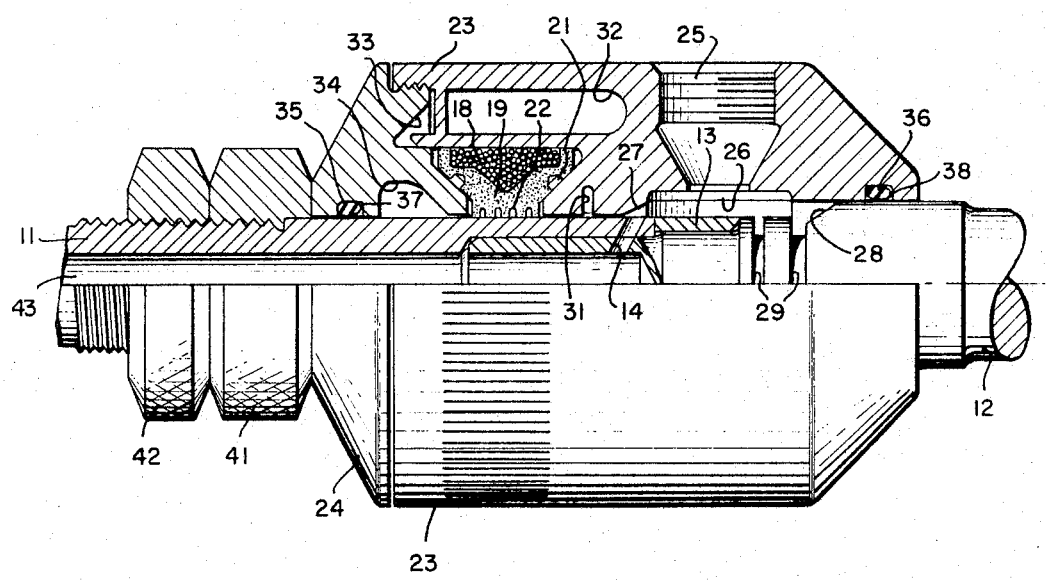

Other objects and many of the attendant advantages of this invention will be readily appreciated as the same becomes better understood by reference to the following detailed description when considered in conjunction with the accompanying drawings, wherein:

FIGURE 1 is a pictorial view with a quarter section broken away to clearly illustrate the internal construction with the valve in its closed position, and FIGURE 2 is a sectional view illustrating the construction of the valve body and shaft on a larger scale with the valve in its open position.

Referring now to the drawings in detail and more particularly to FIGURE 1, one preferred embodiment of the present invention which was built primarily for manual operation and testing is illustrated. However, it will be obvious that the valve of the present invention may take various forms and may be remotely actuated by numerous conventional means, particularly for space applications, where the concepts of the present invention are particularly advantageous.

The lower shaft 11 is hollow and connected to the upper shaft 12 preferably by a press fit to hold the annular sleeve 13 in position. However, the upper and lower shaft obviously may be made integral and the sleeve 13 inserted or formed in some other manner. The upper shaft 12 is solid except for the lower portion which fits into an enlarged bore in the lower shaft 11, and at this point a plurality of openings 14 are formed through the overlapping portions of the upper and lower shafts.

The upper shaft 12 may be provided with a ball handle 15 containing a switch 16 which may be manually operated to actuate a relay (not shown) through the leads 17 which in turn energizes the heating element 18.

As shown in FIGURE 2 on a larger scale, the heating element 18 surrounds a porous sealing ring 19 which is filled with solder and surrounds the sleeve 13 which is preferably formed of copper or some other metal having affinity for the particular solder utilized. The porous ring 19 may also be provided with a plurality of small recesses 21 which form a reservoir for the solder to assure an adequate supply of solder for forming a tight seal between the porous ring 19 and the copper sleeve 13. The porous ring 19 may also be provided with a plurality of grooves 22 which hold the solder in contact with the sleeve 6, and also provide a scraping and cleaning action during movement of the valve in order to assure clean surfaces on the porous ring 19 and sleeve 13 for the next soldering action.

The valve housing 23 is provided with a retainer cap 24 which is screwed into the housing 23 to retain the heating element 18 and porous ring 19 in their proper position. Housing 23 is also provided with an inlet opening 25 which leads to a shallow annular recess 26 surrounding the large diameter portion of the upper shaft 12. The inlet opening 25 and annular recess 26 communicate with the openings 14 in the open position of the valve. Adjacent the annular recess 26 the valve housing 23 is provided with a frusto-conical seat 27 which is engaged by the frusto-conical portion 28 formed on the upper shaft 12 in the closed position of the valve. Just below the frustoconical portion 28, the upper shaft 12 is formed with a plurality of annular grooves 29, and the housing 23 is also formed with an annular groove 31. These grooves 29 and 31 together with the frusto-conical portion 28 engaging the seat 27 provide a labyrinth throttling effect during closure of the valve, which will minimize the amount of pressure which would be applied to the solder seal during the period when the solder is hardening.

The grooves 29 and 31 together with annular passages 32, 33 and 34 formed in the valve housing 23 provide a heat barrier and the latter passages may be filled with insulation to minimize heat conduction through the valve housing and concentrate the heat in the porous ring 19 to melt the solder.

The valve housing 23 has been provided with O-rings 35 and 36 seated in suitable annular grooves 37 and 38 for preventing leakage, but these rings 35 and 36 can obviously be replaced by suitable metal bellows seals, which would be soldered, welded or otherwise secured to the housing 23 and to the lower shaft 11 and upper shaft 12 for absolutely stopping any leakage whatsoever. Furthermore, if desired, additional solder seals such as the primary seal illustrated could be utilized in place of the O-rings 35 and 36 to positively prevent leakage.

In the embodiment shown, the lower shaft 11 has been provided with a nut 41 and a locknut 42 for limiting the movement or travel of the shafts 11 and 12 within the housing 23, so that the openings 14 are aligned with the annular recess 26 in the open position of the valve and fluid will flow through the inlet 25 to the openings 14 and out through the outlet opening 43 at the end of the lower shaft 1.

The porous sealing ring 19 may be formed of sintered metal, a porous, ceramic material or pressed metallic wool, such as stainless steel wool, and the pores as well as the recesses 21 and the grooves 22, if desired, may be filled with any suitable solder. For certain particular applications, such as used at very low temperatures, it may be desirable to use some metal, such as mercury or certain alloys, which have a very low melting point, and which will form an amalgam with the contiguous surfaces of the sealing ring 19 and the sleeve 13. For certain applications, it may be desirable to circulate a cooling fluid through the passages such as 32, 33 and 34 for hardening a normally liquid metal, such as mercury, or for speeding up the cooling and hardening of the solder, after it has been heated above the melting point.

If desired, the heating element 18 may be positioned inside of the sleeve 13, or two heating elements, one inside the sleeve 13 and the other, as shown, externally of the sealing ring 19, may be used in combination. While the solder seal has been shown in conjunction with a separate hard valve seat, it may be used by itself and may have a cylindrical or frusto-conical configuration in an arrangement such as that shown. In other types of valves, the solder seal of the present invention could possibly be in the form of a disk or a ring of porous material seating against a complementary disk or ring formed of material which has an affinity for solder and will form a fluid tight seal. If required for particularly difficult sealing problems, a plurality of spaced sealing rings may be utilized at various points, for example, on the shafts 11 and 12 at the positions indicated for the O-rings 35 and 36, and in combination with corresponding sleeves in the shaft.

The solder contained in the porous sealing ring may be melted by applying a continuous A.C or D.C. current to the heating element 18, or a pulse discharge from a capacitor or other storage device may be utilized, if desired. The sleeve 13 which is positioned in proximity to the porous sealing ring 19 during sealing, is preferably formed of copper or some other metal having an affinity for solder in order to provide a good fluid tight seal, but the upper and lower shafts 12 and 11 are preferably formed of stainless steel or some other similar material to which the solder will not readily stick, and which will also be resistant to any corrosive material which might pass through the valve.

In the operation of the valve of the present invention, it will be apparent that the valve may be sealed in the position shown in FIGURE 1 by actuating the switch 16 and energizing the heating element 18 in order to melt the solder in the sealing ring 19 and form a bond between the sealing ring 19 and the sleeve 13. If the valve is initially open as shown in FIGURE 2, the fluid will be throttled by the frusto-conical valve seat 27 and the frusto-conical portion 28 together with the annular grooves 29 and 31 during closure, so that the molten solder will not blow out. When it is desired to open the valve, the heating element 18 is again energized by the switch 16 in order to melt the solder, and a force exerted on the lower shaft 11 in the direction of the ball handle will move the shaft until the openings 14 are aligned with the annular recesses 26, thus permitting fluid to pass through the inlet 25 and annular recess 26, and then through the openings 14 and out through the outlet 43. However, if it is desired to open the valve extremely fast without waiting for the solder to melt, the valve can be opened by an impact force which will shear the solder permitting the valve to move very rapidly into the open position.

It will be apparent that in actual use of the valve of the present invention, the switch 16, with or without an associated relay, may be positioned at any place in the system for remote actuation of the valve, and the mechanical movement of the shafts 11 and 12 in the housing 23 may be performed by a spring, solenoid or by any suitable hydraulic or pneumatic actuators (not shown).

It will be obvious from the foregoing description that the basic concepts of the present invention have numerous advantages over the various types of solder valves previously known. First of all the solder is held in position by a porous element, so that the solder is not blown out when the seal is effected under high pressure, and solder is forced out between the contiguous surfaces of the porous ring and sleeve by thermal expansion and capillary action. During the initial sealing or subsequent closing and resealing operations, the flow of high pressure fluid is first throttled and substantially cut off by engagement of the frusto-conical portion 28 with the complementary valve seat 27. The fluid is also throttled by the labyrinth effect of the staggered annular grooves formed on the upper shaft 12 and the inner surface of the housing 23, which are located between the valve seat 27 and the sealing ring 19, if there is any leakage past the valve seat. Therefore, the solder will not be blown out during the time when it is cooling from the molten to the solid state. Furthermore, the annular grooves formed on the shaft and also on the inner surfaces of the sealing ring and the valve housing provide a self-cleaning, scraping action, wherein the grooves also serve to collect any foreign matter or excess solder. The valve may be quickly and easily opened either by heating or by a shearing impact action, and the heat from the heating element is localized adjacent the sealing ring by a plurality of annular grooves or passages which form a heat barrier.

Obviously many other modifications and variations to the present invention may be made within the scope of the following claims.

The embodiments of the invention in which an exclusive property or privilege is claimed are defined as follows:

1. A solder valve comprising:
   (a) a housing having a fluid passage therein;
   (b) a movable member in said housing arranged to substantially close said passage in one position and open said passage in another position,
      said housing and said movable member having contiguous surfaces providing a leakage path in the closed position of said valve;
   (c) a porous sealing element positioned on one of said surfaces adjacent said leakage path,
      said sealing element having its pores filled with a fusible material; heating means adapted to melt said fusible material whereby said material may be melted and form a fluid tight seal on solidification to prevent leakage between said surfaces.

2. A solder valve comprising:
   (a) a housing having a fluid passage therein;
   (b) a movable member in said housing arranged to substantially close said passage in one position and open said passage in another position,
      said housing and said movable member having contiguous surfaces providing a leakage path in the closed position of said valve;
   (c) a porous sealing element positioned on one of said surfaces adjacent said leakage path, said sealing element having its pores filled with a fusible material;
   (d) a heating element positioned adjacent said sealing element whereby said material may be melted and form a fluid tight seal on solidification to prevent leakage between said surfaces.

3. A solder valve comprising:
   (a) a housing having a fluid passage therein:
   (b) a movable member in said housing arranged to substantially close said passage in one position and open said passage in another position,
      said housing and said movable member having contiguous surfaces providing a leakage path in the closed position of said valve;
   (c) a porous sealing element positioned on one of said surfaces adjacent said leakage path,
      said sealing element having its pores filled with a fusible metallic material;
   (d) a heating element positioned adjacent said sealing element whereby said material may be melted and form a fluid tight seal on solidification to prevent leakage between said surfaces.

4. A solder valve comprising:
   (a) a housing having a valve seat therein, a first fluid opening in said housing;
   (b) a valve stem movable with respect to said housing, an outlet opening in said stem communicating with said first opening in one position of said stem, said stem having a portion engaging said valve seat for throttling and substantially cutting off fluid flow in another position of said stem;
   (c) a porous sealing element, the pores of said sealing element being filled with a metallic material which melts at a predetermined temperature,
      said element being located in contiguous relation to a complementary surface along a leakage path in said valve to provide a fluid tight seal;
   (d) a heating element adjacent said sealing element for melting said metallic material.

5. A solder valve comprising:
   (a) a housing having a valve seat therein, a first fluid opening in said housing;
   (b) a valve stem movable with respect to said housing, an outlet opening in said stem communicating with said first opening in one position of said stem,
      said stem having a portion engaging said valve seat for throttling and substantially cutting off fluid flow in another position of said stem;
   (c) a porous sealing element, the pores of said sealing element being filled with a metallic material which melts at a predetermined temperature,
      said element being located in contiguous relation to a complementary surface along a leakage path in said valve to provide a fluid tight seal;
   (d) a heating element adjacent said sealing element for melting said metallic material;
   (e) means for energizing said heating element.

6. A solder valve comprising:
   (a) a housing having an axial bore with a valve seat formed therein,
      a fluid opening in said housing extending into an enlarged portion of said bore;
   (b) a valve stem slidably mounted in said bore and movable with respect to said housing,
      said stem having a portion for engaging said valve seat and arresting fluid flow through said bore and movable to an open position providing for fluid flow;
   (c) a porous sealing ring mounted in said housing around said stem, the pores of said sealing element being filled with a fusible material which melts at a predetermined temperature;
   (d) a heating element adjacent said sealing element for melting said fusible material.

7. A solder valve comprising:
   (a) a housing having an axial bore with a frusto-conical valve seat formed therein,
      a fluid opening in said housing extending into an enlarged portion of said bore;
   (b) a valve stem slidably mounted in said bore and movable with respect to said housing,
      said stem having a frusto-conical portion for engaging said valve seat for throttling and substantially cutting off fluid flow through said bore and movable to an open position providing for fluid flow;
   (c) a porous sealing ring mounted in said housing around said stem,
      the pores of said sealing element being filled with a fusible material which melts at a predetermined temperature,
      a sleeve on said stem located in contiguous relation to said sealing element in the closed position of said valve;
   (d) a heating element adjacent said sealing element for melting said fusible material.

8. A solder valve comprising:
   (a) a housing having an axial bore with a frusto-conical valve seat formed therein, a fluid opening in said housing extending into an enlarged portion of said bore;

(b) a valve stem slidably mounted in said bore and movable with respect to said housing, said stem having a frusto-conical portion for engaging said valve seat for throttling and substantially cutting off fluid flow through said bore and movable to an open position providing for fluid flow;

(c) a porous sealing ring mounted in said housing around said stem, the pores of said sealing element being filled with a fusible material which melts at a predetermined temperature, a sleeve on said stem located in contiguous relation to said sealing element in the closed position of said valve, (d) a heating element adjacent said sealing element for melting said fusible material, a plurality of annular passages in said housing adjacent said heating element for concentrating heat in said sealing ring.

9. A solder valve comprising:

(a) a housing having an axial bore with a frusto-conical valve seat formed therein, a fluid opening in said housing extending into an enlarged portion of said bore;

(b) a valve stem slidably mounted in said bore and movable with respect to said housing, said stem having a frusto-conical portion for engaging said valve seat for throttling and substantially cutting off fluid flow through said bore and movable to an open position providing for fluid flow;

(c) a porous sealing ring mounted in said housing around said stem, the pores of said sealing element being filled with a fusible material which melts at a predetermined temperature, a sleeve on said stem located in contiguous relation to said sealing element in the closed position of said valve, said sealing element having a plurality of internal annular grooves adjacent said stem;

(d) a heating element adjacent said sealing element for melting said fusible material, a plurality of annular passages in said housing adjacent said heating element for concentrating heat in said sealing ring.

10. A solder valve comprising:

(a) a housing having an axial bore with a frusto-conical valve seat formed therein, a fluid opening in said housing extending into an enlarged portion of said bore;

(b) a valve stem slidably mounted in said bore and movable with respect to said housing, said stem having a frusto-conical portion for engaging said valve seat to arrest fluid flow through said bore and a plurality of annular grooves formed on said stem and housing for throttling and substantially cutting off fluid flow, said stem being hollow at one end and having a plurality of openings extending through the side wall thereof and communicating with said fluid opening in the open position of said valve to define a fluid flow path communicating with the exterior of said housing;

(c) a porous sealing ring mounted in said housing around said stem, the pores of said sealing element being filled with a fusible metallic material which melts at a predetermined temperature, a sleeve on said stem located in contiguous relation to said sealing element in the closed position of said valve, said sealing ring having a plurality of internal annular grooves adjacent said stem;

(d) an electrical heating element adjacent said sealing element for melting said fusible material, a plurality of annular passages in said housing adjacent said heating element for concentrating heat in said sealing ring.

References Cited by the Examiner

UNITED STATES PATENTS

| | | | |
|---|---|---|---|
| 300,792 | 6/1884 | Nicholson | 251—353 X |
| 2,799,522 | 7/1957 | King et al. | 277—22 X |
| 2,992,017 | 7/1961 | Dritz | 285—41 X |
| 2,992,838 | 7/1961 | Wallace | 277—22 X |
| 3,117,792 | 1/1964 | Glenn et al. | 277—22 |

WILLIAM F. O'DEA, *Primary Examiner.*

R. GERARD, *Assistant Examiner.*